(12) United States Patent
Auer et al.

(10) Patent No.: US 12,025,474 B2
(45) Date of Patent: Jul. 2, 2024

(54) MEASURING DEVICE

(71) Applicant: DR. JOHANNES HEIDENHAIN GmbH, Traunreut (DE)

(72) Inventors: Daniel Auer, Traunstein (DE); Christoph Heinemann, Palling (DE); Marc Oliver Tiemann, Waging am See (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 351 days.

(21) Appl. No.: 17/761,718

(22) PCT Filed: Jul. 14, 2020

(86) PCT No.: PCT/EP2020/069819
§ 371 (c)(1),
(2) Date: Mar. 18, 2022

(87) PCT Pub. No.: WO2021/052651
PCT Pub. Date: Mar. 25, 2021

(65) Prior Publication Data
US 2022/0341757 A1 Oct. 27, 2022

(30) Foreign Application Priority Data
Sep. 18, 2019 (DE) .......................... 102019214219.2

(51) Int. Cl.
*G01D 5/20* (2006.01)
*G01L 3/14* (2006.01)

(52) U.S. Cl.
CPC ............ *G01D 5/2053* (2013.01); *G01L 3/145* (2013.01)

(58) Field of Classification Search
CPC .. G01D 5/12; G01D 5/14; G01D 5/16; G01D 5/165; G01D 5/20; G01D 5/2053;
(Continued)

(56) References Cited

U.S. PATENT DOCUMENTS

| 6,111,402 | A | 8/2000 | Fischer |
| 2006/0144166 | A1* | 7/2006 | Ruehl .................... G01L 3/105 73/862.331 |

(Continued)

FOREIGN PATENT DOCUMENTS

| CN | 104677537 A | 6/2015 |
| CN | 106840492 A | 6/2017 |

(Continued)

OTHER PUBLICATIONS

Notice of Reasons for Refusal issued by the Japanese Patent Office on Apr. 22, 2024 in corresponding JP Patent Application No. 2022-512334, with English translation.

(Continued)

*Primary Examiner* — Benjamin R Schmitt
(74) *Attorney, Agent, or Firm* — Carter, DeLuca & Farrell LLP

(57) ABSTRACT

A measuring device includes first and second component groups rotatable about an axis relative to each other. The first component group has a scanning component, having a first substrate, and the second component group has a scale component, having a second substrate and an angle scale. The measuring device can determine a relative angular position between the component groups. The measuring device has a passive sensor array having conductor track structures. The conductor track structures are applied on the first substrate by an additive process so that the sensor array determines a torsional load of the first substrate about the axis. Alternatively, the conductor track structures are applied on the second substrate by an additive process so that the sensor array determines a torsional load of the second substrate about the axis.

21 Claims, 3 Drawing Sheets

(58) Field of Classification Search
CPC .... G01D 5/25; G01L 3/00; G01L 3/14; G01L 3/1428; G01L 3/145
See application file for complete search history.

(56) References Cited

U.S. PATENT DOCUMENTS

| | | |
|---|---|---|
| 2010/0028200 A1 | 2/2010 | Shiosawa |
| 2011/0267045 A1 | 11/2011 | Baller |
| 2019/0064018 A1 | 2/2019 | Miyazawa |

FOREIGN PATENT DOCUMENTS

| | | | |
|---|---|---|---|
| CN | 107490448 | A | 12/2017 |
| CN | 108955972 | A | 12/2018 |
| DE | 29724833 | U1 | 7/2004 |
| DE | 102018200234 | A1 | 7/2019 |
| EP | 2447690 | A2 | 5/2012 |
| JP | H02-129110 | A | 5/1990 |
| JP | H10-213407 | A | 8/1998 |
| JP | 2004-198400 | A | 7/2004 |
| JP | 2006-322771 | A | 11/2006 |
| JP | 2016-205861 | A | 12/2016 |
| JP | 2017-203645 | A | 11/2017 |

OTHER PUBLICATIONS

International Search Report issued in corresponding International Application No. PCT/EP2020/069819 dated Oct. 23, 2020, pp. 1-2.

\* cited by examiner

MEASURING DEVICE

FIELD OF THE INVENTION

The present invention relates to a measuring device, e.g., for determining relative angular positions and a torque.

BACKGROUND INFORMATION

For example, measuring devices are used as rotary encoders for determining the angular position of two machine parts that are rotatable relative to each other. In measuring devices based on an inductive measuring principle, excitation coils and receiver coils, such as in the form of conductor tracks, are mounted on a shared circuit board or a shared substrate, which is firmly connected to a stator of a rotary encoder, for example. Situated opposite this circuit board is a scale element on which electrically conductive and non-conductive surface areas are alternatingly applied at periodic intervals as a graduation region or graduation structure, and which is connected to the rotor of the rotary encoder in a torsionally fixed manner. If an electric excitation current that varies over time is applied to the excitation coils, signals that are a function of the angular position are generated during a relative rotation between the rotor and stator. These signals are then further processed in an evaluation electronics.

Such measuring devices are frequently used as measuring units for electric drives for the purpose of determining the relative movement or the relative position of corresponding machine parts, e.g., in robot joints. In this case, the angular position values, which are generated by scanning components, are conveyed to subsequent electronics for actuating the drives via a corresponding interface system.

BACKGROUND INFORMATION

European Patent Document No. 2 447 690 describes a measuring device in which magnetic poles were produced on a shaft for measuring the angular position. Moreover, force-sensitive regions are arranged on this shaft, which influence the magnetic fields as a function of the force so that a torque is measurable as well.

SUMMARY

Example embodiments of the present invention provide a measuring device that is relatively easy to produce and which allows for a better measurement of an angular position together with a torque.

According to an example embodiment of the present invention, a measuring device includes a first component group and a second component group, the component groups being positioned so as to be rotatable about an axis relative to each other. The first component group has a scanning component, which has a first substrate, which, for example, has a scanning element or on which a scanning element is situated. The second component group has a scale component, which has a second substrate and an angle scale so that the measuring device is able to determine a relative angular position between the first component group and the second component group. In addition, the measuring device has a passive sensor array, which includes conductor track structures. Moreover, on the scanning component, the conductor track structures are applied on the first substrate by an additive process so that the sensor array is able to be used to determine a torsional load of the first substrate about the axis. Alternatively, on the scale element, the conductor track structures are applied on the second substrate by an additive process so that the sensor array is able to determine a torsional load of the second substrate about the axis.

For example, a passive sensor array is arranged as a sensor array provided with passive sensors or passive components whose parameters are changed by the torsional load. Electronic components transform these parameters into electrical signals, e.g., within the measuring device. An externally supplied auxiliary energy, e.g., in the form of electrical energy, is required to operate the passive sensor device. In this case for example, the electrical resistance or the electrical resistances of the conductor track structures may be used as a parameter. To allow for the measurement of the electrical resistance or a resistance change, an electric current must flow through the sensor array, e.g., also through the conductor track structures, which means that the sensor array must be supplied with electrical energy from the outside while in operation. The conductor track structures react to a torsional load by a change in their length and cross-section, which affects their electrical resistance.

The conductor track structures are produced by an additive process on the first or the second substrate. During the production of such an additive structure, layers are applied or patterned (e.g., lift-off method) on the particular substrate across a large area. For instance, this is accomplished by a chemical reaction or condensation of gaseous materials on the surface of the substrate. Alternatively, the additive structure may also be produced by a liquid phase deposition. The term 'additive structure' should not be understood as bonding of the conductor track structures to the first or second substrate.

For example, the conductor track structures may be situated on a flat surface of the first or the second substrate. In the same manner, the scanning element may be situated on a flat surface of the first substrate and/or the angle scale may be situated on a flat surface of the second substrate.

According to example embodiments, the conductor track structures of the sensor unit and the remaining conductor track structures for a linkage of electronic components on the particular substrate are produced using one and the same process. Moreover, the same process may also be used to produce the angle scale.

The scanning component and the scale component may be positioned so that they are separated from each other by an axial gap, i.e., by a gap that extends in the direction of the axis about which the component groups are rotatable relative to each other. The flat surface on which the conductor track structures are disposed is, for example, situated orthogonal to the axis about which the component groups are situated in order to be rotatable relative to each other.

According to example embodiments, the conductor track structures have multiple sections in each case in which the conductor track structures extend in a curved manner.

For example, the conductor track structures extend in parallel in the sections.

According to example embodiments, the radius of curvature of the conductor track structures in the sections differs as a function of the distance from the axis. More particularly, the radius of curvature becomes larger with increasing distance from the axis.

According to example embodiments, the conductor track structures in the sections intersect at the same angle with circular lines that may have different radii but whose center point lies on the axis. For example, the angle between the tangent on the circular line and the tangent of the conductor track structure in the point of intersection at different points in the sections always has the same size. For example, the conductor track structures in the sections extend according to a logarithmic spiral in each case.

According to example embodiments, the angle amounts to between 20° and 70°, e.g., between 30° and 60°, between 40° and 50°, etc.

According to example embodiments, the torsional load is able to be determined by determining the resistance of the conductor track structures.

For example, the sensor array includes four conductor track structures, which are interconnected according to a bridge circuit. A Wheatstone bridge, for example, may be implemented which, for example, is used for determining the average Ohmic resistance of the conductor track structures.

According to example embodiments, at least one excitation conductor track and, as a scanning element, at least one receiver track having a plurality of receiver conductor tracks are situated on the first substrate. A corresponding system for determining the relative angular position is based on an inductive measuring principle, for example.

It should be understood, however, that measuring device described herein is not restricted to the determination of the relative angular position is based on an inductive measuring principle. Instead, optical or magnetic measuring principles, for instance, may also be employed.

According to example embodiments, at least one electronic component by which signals that are able to be generated by the scanning component can be further processed is situated on the first substrate.

Moreover, the angle scale may include electrically conductive and non-conductible graduation regions that are situated in alternation on the second substrate.

According to example embodiments, the first substrate or the second substrate or the first substrate and the second substrate is/are made of plastic.

Alternatively, the first substrate or the second substrate or the first substrate and the second substrate may be made of metal, e.g., steel or aluminum.

For example, on the scanning component, the conductor track structures of the sensor array, e.g., the mentioned sections, are applied on the first substrate radially inward with regard to the axis relative to a scanning element. The conductor track structures are therefore closer to the axis than the scanning element.

According to example embodiments, on the scale component, the conductor track structures are applied on the second substrate radially inward with regard to the axis relative to the angle scale. As a result, the conductor track structures are closer to the axis than the angle scale in this case.

Further details and aspects of the measuring device according to example embodiments of the present invention are described in more detail below with reference to the appended schematic Figures.

DETAILED DESCRIPTION

Figure 1:
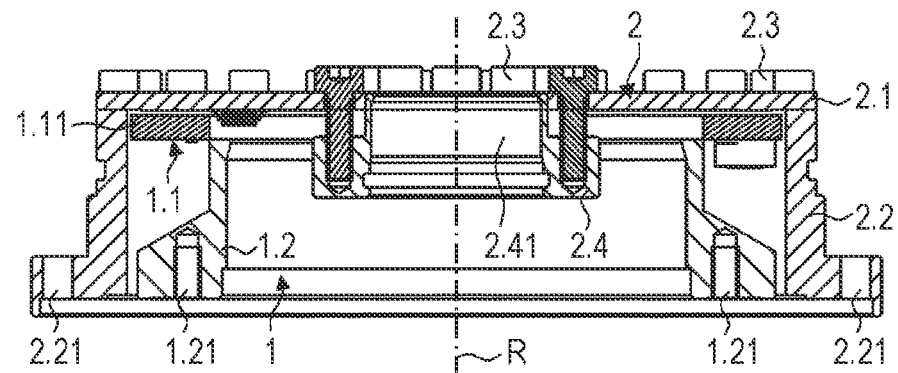
FIG. 1 is a cross-sectional view a measuring device according to an example embodiment of the present invention.

An exemplary embodiment of the present invention is described with reference to the device as shown in FIG. 1, for example. The device has a measuring device which includes a first component group 1 and a second component group 2, the first component group 1 being positioned so as to be rotatable about an axis R relative to the second component group 2. For example, first component group 1 may be arranged as a stator and second component group 2 may be arranged as a rotor.

First component group 1 includes a scanning component 1.1, which has a first substrate 1.11 and which is connected to a first flange 1.2 in a torsionally fixed manner. Situated axially opposite scanning component 1.1 is a scale component 2.1, which is to be allocated to second component group 2 and is connected to a second flange 2.2 and a hub 2.4 in a torsionally fixed manner.

Figure 2:
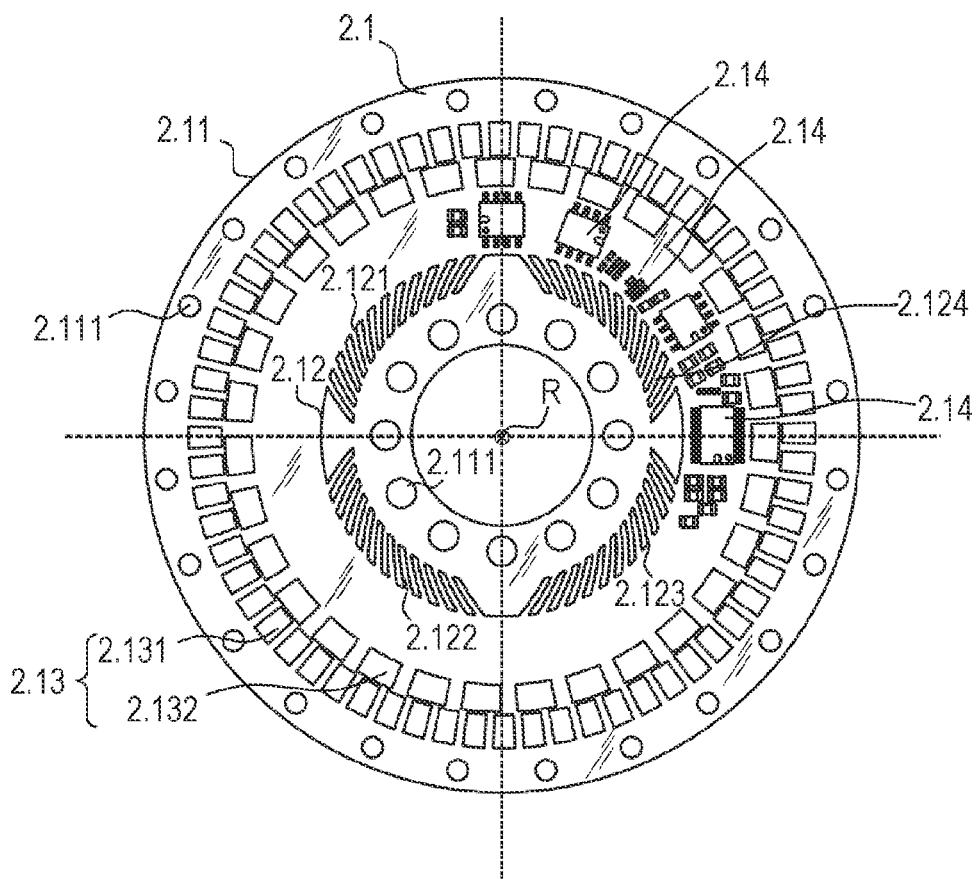
FIG. 2 is a top view of a scale component.

FIG. 2 is a top view of scale component 2.1. Scale component 2.1 includes a second substrate 2.11, which is made of an (e.g., fiber-reinforced) epoxy resin, a plastic reinforced with carbon fiber, or a metal such as steel, for example. For the fastening to flange 2.2, scale component 2.1 or second substrate 2.11 is/are provided with bores 2.111, bores 2.111 being situated on circular lines along an inner diameter and along an outer diameter. With the aid of screws 2.3, scale element 2.1 is able to be connected in a torsionally fixed manner to flange 2.2 at the outer diameter and to hub 2.4 at the inner diameter. An angle scale 2.13, which includes two graduation tracks 2.131, 2.132, is mounted on second substrate 2.11. Graduation tracks 2.131, 2.132 have a circular configuration and are situated on second substrate 2.11 with different diameters concentrically with respect to axis R. The two graduation tracks 2.131, 2.132 in each case include a periodic sequence of alternatingly disposed electrically conductive graduation regions and non-conductive graduation regions (applied using an additive process). In the illustrated example, copper is applied on second substrate 2.11 as the material for the electrically conductive subregions. In the non-conductive regions, on the other hand, second substrate 2.11 is not coated. In the event that second substrate 2.11 is produced from a metal material such as steel, a plastic layer, e.g., of polyimide, is provided between the conductive subregions and second substrate 2.11.

In addition, a sensor array 2.12, e.g., in the form of conductor tracks or conductor track structures 2.121, 2.122, 2.123, 2.124, is applied on second substrate 2.11 using an additive process, for example, with the aid of a photolithographic process.

If second substrate 2.11 is made from a metal material such as steel, a plastic layer, e.g., of polyimide, is produced between the conductive subregions and second substrate 2.11 or between conductor track structures 2.121, 2.122, 2.123, 2.124 and second substrate 2.11.

Figure 3:
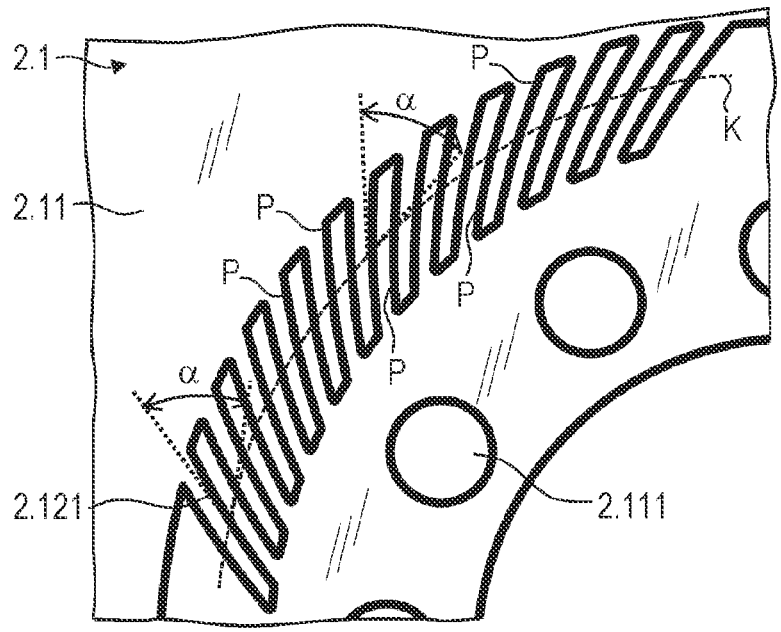
FIG. 3 is an enlarged view of a sensor array.

Sensor array 2.12 has a substantially circular configuration and is centrically positioned with regard to axis R. In addition, sensor array 2.12 or conductor track structures 2.121, 2.122, 2.123, 2.124 is/are situated in a plane that has an orthogonal orientation to axis R. More particularly, sensor array 2.12 is arranged in point symmetry with respect to a point on axis R. Sensor array 2.12 includes conductor track structures 2.121, 2.122, 2.123, 2.124, which may be made of copper or steel, for instance. Conductor track structures 2.121, 2.122, 2.123, 2.124, according to FIG. 3, have multiple sections P in each case in which conductor track structures 2.121, 2.122, 2.123, 2.124 have a curved and parallel extension. In the illustrated exemplary embodiment, conductor track structures 2.121, 2.122, 2.123, 2.124 extend along parallel spiral lines in the regions of sections P so that the radius of curvature of conductor track structures 2.121, 2.122, 2.123, 2.124 within sections P differs as a function of the distance from axis R. More particularly, conductor track structures 2.121, 2.122, 2.123, 2.124 in sections P intersect with a circular line K whose center point lies on axis R at an angle α of approximately the same size. In the illustrated exemplary embodiment, angle α amounts to 45°. Conductor track structures 2.121, 2.122, 2.123, 2.124 in sections P thus extend according to a logarithmic spiral in each case. Each tangent on circular line K always intersects the logarithmic spiral under the same angle α (isogonal trajectory), this characteristic applying to random circular lines having different radii whose common center point lies on axis R. The conductor track structures 2.121, 2.122, 2.123, 2.124 in sections P therefore extend according to an equiangular spiral. In the illustrated exemplary embodiment, the equiangular or logarithmic spiral and thus the extension of conductor track structures 2.121, 2.122, 2.123, 2.124 in sections P is uniquely characterized by the angle α=45°. Conductor track structures 2.121, 2.122, 2.123, 2.124 are situated and connected to one another such that they form a Wheatstone bridge.

In addition, electronic components 2.14 are mounted on second substrate 2.11 (see, e.g., FIG. 2), which supply sensor array 2.12 with a suitable electric voltage or a suitable electric current and in addition further process the signals or resistance values generated by conductor track structures 2.121, 2.122, 2.123, 2.124. Since a passive sensor array 2.12 is involved, a supply of sensor array 2.12 with auxiliary energy is mandatory.

Figure 4:
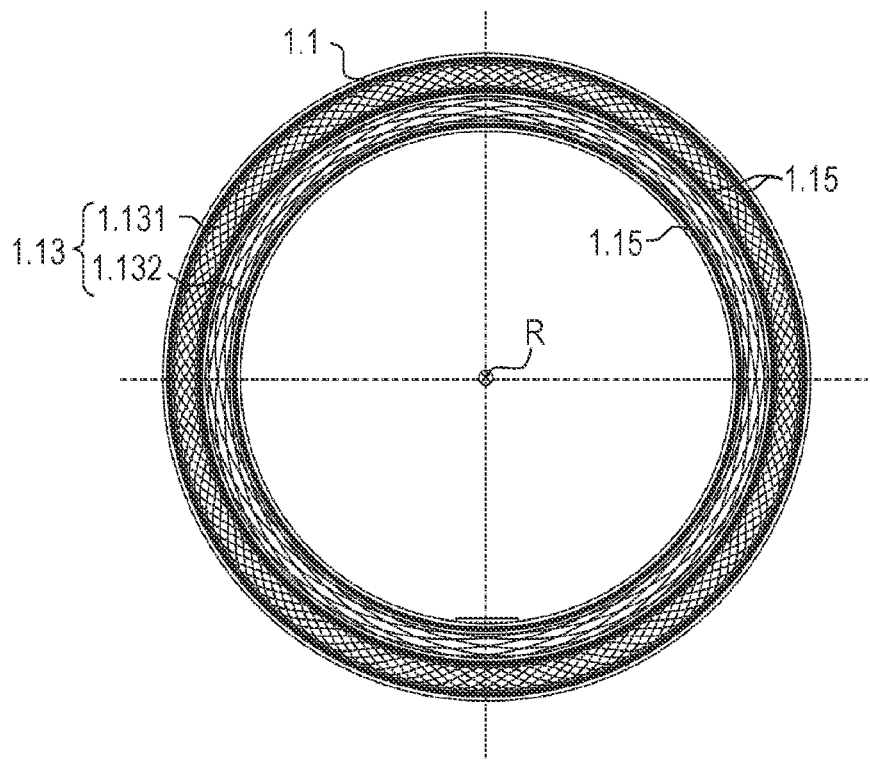
FIG. 4 is a top view of a scanning component.

Scanning component 1.1 provided for scanning scale component 2.1 and shown in FIG. 4 includes a scanning element 1.13. It includes two receiver conductor tracks in an outer first receiver track 1.131 and two receiver conductor tracks in an inner second receiver track 1.132. The associated pairs of receiver conductor tracks of a respective receiver track 1.131, 1.132 are disposed at an offset relative to each other (e.g., at a regular mutual offset).

In addition, excitation conductor tracks 1.15, which are mounted on an inner, a middle, and an outer excitation track, are provided on scanning component 1.1 as excitation coils. Scanning component 1.1 itself has an annular configuration development and thus includes a center bore.

With the aid of threaded bores 1.21, a first machine element is able to be fastened to first flange 1.2, which may be allocated to the stator. Hub 2.4 has a central opening 2.41 into which a drive shaft is insertable, which is able to be connected to hub 2.4 in a torsionally fixed manner. In this manner, a rotary motion may be introduced into hub 2.4 and thus also into scale component 2.1. Hub 2.4 and second flange 2.2 are connected to each other via scale component 2.1. A further machine part may be fastened to second flange 2.2 on the rotor side with the aid of bores 2.21 in second flange 2.2. As a result, an output-side machine part is able to be fixed in place on second flange 2.2. In the assembled state of the position sensor illustrated in FIG. 1, scale component 2.1 and scanning component 1.1 are thus disposed axially opposite each other so that axis R extends through the center points of both elements and a signal as a function of the respective angular position is able to be generated by induction effects in a relative rotation between scale component 2.1 and scanning component 1.1.

An ASIC component mounted on scanning component 1.1 is used for this purpose, which operates not only as an evaluation unit but also as an excitation control element under whose control the excitation current is generated which flows through excitation conductor tracks 1.15. The excitation current induces voltages in the receiver conductor tracks as a function of the angular position of scale component 2.1, and these voltages may also be denoted as signals.

The receiver conductor tracks of outer receiver track 1.131 have more windings than the receiver conductor tracks of inner receiver track 1.132 in each case. Moreover, the outer graduation track 2.131 has more electrically conductive graduation regions (and more non-conductive graduation regions) than the inner graduation track 2.132. Outer graduation track 2.131 is scanned by outer receiver track 1.131 or the associated receiver conductor tracks. Outer receiver track 1.131 supplies a relatively highly resolving incremental signal during a rotation of scale component 2.1 relative to scanning component 1.1. Inner receiver track 1.132, on the other hand, supplies a relatively lower-resolving incremental signal when inner graduation track 2.132 is scanned. At the same relative rotation between scanning component 1.1 and scale component 2.1, the receiver conductor tracks of inner receiver track 1.132 generate a lower number of signal periods than the receiver conductor tracks of outer receiver track 1.131. By combining the incremental signals, absolute angle information is able to be generated.

However, it is not only possible to determine an angular position but also a torque with the aid of the measuring device. Conductor track structures 2.121, 2.122, 2.123, 2.124 are applied (by an additive process) on scale component 2.1 or on second substrate 2.11 for this purpose. The additive structure of conductor track structures 2.121, 2.122, 2.123, 2.124 may be achieved is according to the same principle as the additive structure of the electrically conductive graduation regions of angle scale 2.13, described above. In relation to axis R, conductor track structures 2.121, 2.122, 2.123, 2.124 are situated radially inside relative to angle scale 2.13. As a result, the distance between conductor track structures 2.121, 2.122, 2.123, 2.124 and axis R is smaller than the distance between angle scale 2.13 and axis R.

Scale component 2.1 is able to be supplied with electrical energy. For example, this may be achieved via a cable (provided the number of possible rotations is limited), via a slip ring, or also in a wireless manner. While the measuring device is in operation, a defined current is conducted through passive sensor array 2.12, which is situated on scale component 2.1 and thus is to be allocated to the rotor in the illustrated exemplary embodiment. Because the drive forces are conducted through scale component 2.1, a deformation of scale component 2.1, although extremely small, is produced. Depending on the deformation of second substrate 2.11 as a result of a torsional load, there is a change in the resistances in conductor track structures 2.121, 2.122, 2.123, 2.124. Utilizing this effect, passive sensor array 2.12 is able to determine a torsional load of second substrate 2.11, a torsion about axis R being present. Electronic components 2.14 generate signals that are transmitted to scanning component 1.1, e.g., in a wireless manner. These signals include information regarding the torsional load of scale component 2.1 and are able to be transmitted to sequential electronics together with the signals that include the information about the relative angular position between scale component 2.1 and scanning component 1.1.

Figure 5:
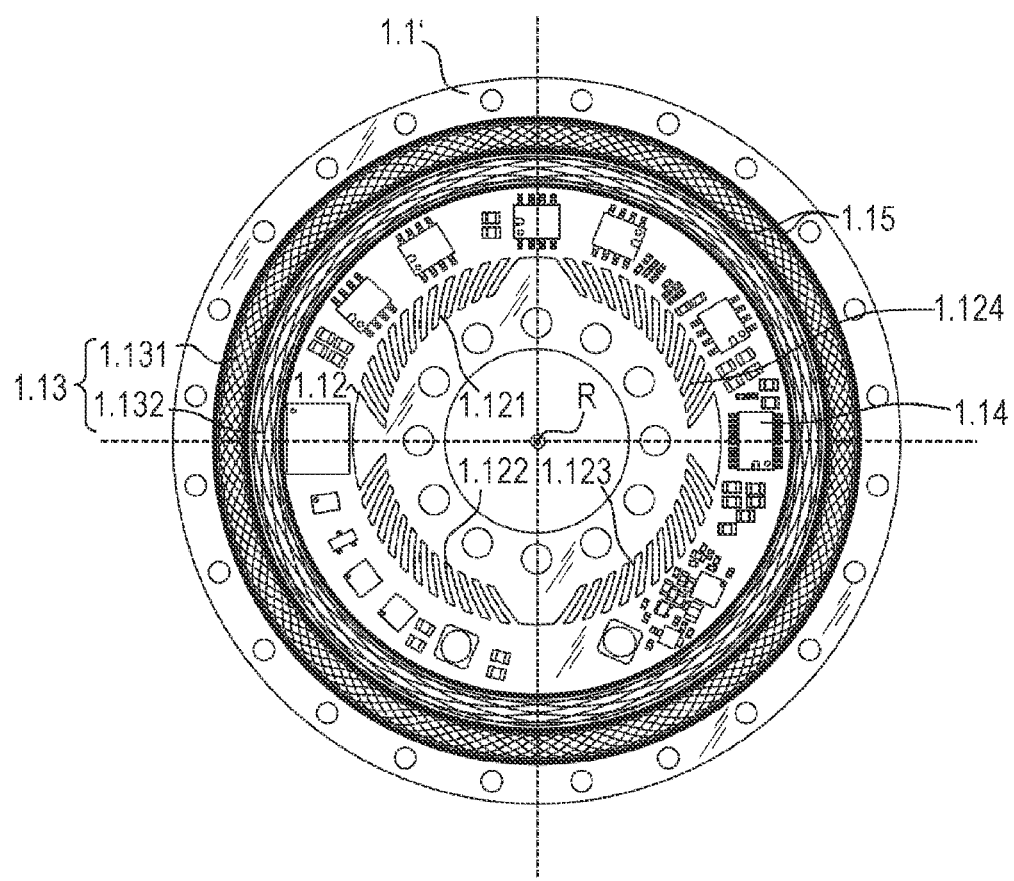
FIG. 5 is a top view of a scanning component according to an exemplary embodiment.

FIG. 5 shows a measuring device according to an example embodiment of the present invention. In contrast to the exemplary embodiment described above, a scanning component 1.1' has both a passive sensor array 1.12 and a scanning element 1.13. It is possible to determine the deformation of scanning component 1.1' as a result of a torsional moment about the axis R. Doing so requires the scanning component 1.1' to be installed in a device, resulting in a corresponding force flow through scanning component 1.1'. Scanning component 1.1' has a series of electronic components 1.14, which are used for the supply of excitation conductor tracks 1.15 and of conductor track structures 1.121, 1.122, 1.123, 1.124 of passive sensor array 1.12. In addition, electronic components 1.14 are also used for conditioning the particular signals pertaining to the torsional moment and angle information. In relation to axis R, conductor track structures 1.121, 1.122, 1.123, 1.124 are situated radially inside relative to scanning element 1.13 (or to receiver tracks 1.131, 1.132). Thus, the distance between conductor track structures 1.121, 1.122, 1.123, 1.124 and axis R is smaller than the distance between scanning element 1.13 and axis R.

The invention claimed is:

1. A measuring device, comprising:
    a first component group including a scanning component, having a first substrate;
    a second component group including a scale component, having a second substrate and an angle scale;
    a passive sensor array, including conductor track structures;
    wherein the component groups are rotatable about an axis relative each other;
    wherein the measuring device is adapted to determine a relative angular position between the first component group and the second component group;
    wherein first ones of the conductor track structures are arranged on the first substrate, and second ones of the conductor track structures are arranged on the second substrate; and
    wherein the sensor array is adapted to determine a torsional load of the first substrate about the axis, and the sensor array is adapted to determine a torsional load of the second substrate about the axis.

2. The measuring device according to claim 1, wherein the first ones of the conductor track structures are arranged on the first substrate as additive structures.

3. The measuring device according to claim 2, wherein the second ones of the conductor track structures are arranged on the second substrate as additive structures.

4. The measuring device according to claim 1, wherein the second ones of the conductor track structures are arranged on the second substrate as additive structures.

5. The measuring device according to claim 1, wherein the conductor track structures extend in a curved manner in multiple sections.

6. The measuring device according to claim 5, wherein the conductor track structures extend in parallel in the sections.

7. The measuring device according to claim 5, a radius of curvature of the conductor track structures differs as a function of distance from the axis.

8. The measuring device according to claim 7, wherein the conductor track structures in the sections intersect at a same angle with circular lines having a center point located on the axis.

9. The measuring device according to claim 8, wherein the angle is between 20° and 70°.

10. The measuring device according to claim 8, wherein the angle is between 30° and 60°.

11. The measuring device according to claim 10, wherein the angle is between 40° and 50°.

12. The measuring device according to claim 1, wherein the sensor array is adapted to determine the torsional load by determining a resistance of the conductor track structures.

13. The measuring device according to claim 1, wherein the sensor array includes four conductor track structures interconnected according to a bridge circuit.

14. The measuring device according to claim 1, wherein an excitation conductor track and a receiver track having a plurality of receiver conductor tracks arranged as a scanning element are arranged on the first substrate.

15. The measuring device according to claim 1, wherein at least one electronic component is arranged on the first substrate and is adapted to process signals generated by the scanning component.

16. The measuring device according to claim 1, wherein the angle scale includes electrically conductive and non-conductive graduation regions alternatingly arranged on the second substrate.

17. The measuring device according to claim 1, wherein the first substrate and/or the second substrate is made of plastic.

18. The measuring device according to claim 1, wherein the first substrate and/or the second substrate is made of metal.

19. The measuring device according to claim 1, wherein the first ones of the conductor track structures that are arranged radially inward with regard to the axis relative to a scanning element are arranged on the first substrate as additive structures.

20. The measuring device according to claim 19, wherein the second ones of the second conductor track structures that are radially inward with regard to the axis relative to the angle scale are arranged on the second substrate as additive structures.

21. The measuring device according to claim 1, wherein the second ones of the second conductor track structures that are radially inward with regard to the axis relative to the angle scale are arranged on the second substrate as additive structures.

* * * * *